United States Patent

[11] 3,581,217

| [72] | Inventor | Wayne R. Isaacs<br>7709 Suburbia St., Houston, Tex. 77047 |
|---|---|---|
| [21] | Appl. No. | 773,433 |
| [22] | Filed | Nov. 5, 1968 |
| [45] | Patented | May 25, 1971 |

[54] FREQUENCY TO DIRECT CURRENT CONVERTER CIRCUIT
22 Claims, 9 Drawing Figs.

[52] U.S. Cl. ................................................ 328/140,
307/229, 307/233, 307/273, 307/295, 324/78,
328/136, 328/145, 340/171
[51] Int. Cl. ...................................................... H03b 3/04
[50] Field of Search ........................................... 328/26,
136, 140, 145, 207; 307/229, 233, 271, 273, 289,
295; 324/78 I, 78 E; 340/171

[56] References Cited
UNITED STATES PATENTS

| 2,921,260 | 1/1960 | Crandon et al. | 324/78(E) |
|---|---|---|---|
| 2,975,368 | 3/1961 | Braun et al. | 324/78(E)X |
| 3,094,629 | 6/1963 | Ostroff et al. | 307/295X |
| 3,197,560 | 7/1965 | Riesz | 324/78(E)X |
| 3,226,577 | 12/1965 | Yasuo Azuma et al. | 307/273X |
| 3,466,526 | 9/1969 | Cole | 324/78(E)X |
| 3,466,550 | 9/1969 | Wolf et al. | 307/233X |
| 3,471,792 | 10/1969 | Axford | 307/233X |

*Primary Examiner*—Stanley T. Krawczewicz
*Attorneys*—Frank C. Parker and Charles C. Krawczyk ABSTRACT: A system is disclosed for converting a periodic signal into a direct current signal that is proportional to and/or a predetermined nonlinear function of the frequency of the periodic signals. The input signals are converted into pulse type signals having a constant amplitude and preset time duration. These pulse type signals are applied to an averaging circuit for providing a direct current output proportional to the frequency and/or to a saturable circuit for providing a direct current signal that is a nonlinear function of the applied frequency. A circuit is included to determine when input frequency has a period shorter than the pulse type signals.

PATENTED MAY 25 1971    3,581,217

WAYNE R. ISAACS
INVENTOR.

BY
Charles C. Krawczyk
ATTORNEY

WAYNE R. ISAACS
INVENTOR.

BY
Charles C. Krawczyk
ATTORNEY

WAYNE R. ISAACS
INVENTOR.

FREQUENCY TO DIRECT CURRENT CONVERTER CIRCUIT

This invention relates to frequency-to-direct current signal conversion apparatus and more particularly to apparatus for providing a direct current signal that is a linear and/or nonlinear function of the frequency of an input signal.

In frequency-to-direct current conversion systems wherein the input signals are converted by switching circuits to constant amplitude and time duration pulses and then the averaged, the accuracy of the system is generally determined by the stability of the switching circuit. It is therefore highly advantageous to maintain the stability of the switching circuit constant. Furthermore, the efficiency of the system at low frequencies is generally governed by the duty cycle of the switching circuit. If the duty cycle of the switching circuit is very short compared to the period of the input signal, it is difficult to provide good averaging. On the other hand, if the duty cycle is designed to be efficient at low frequencies, the frequency range of the apparatus is limited. As a result, such systems require highly stable and readily adjustable switching circuits to provide means for varying the range of the system with a desirable operational efficiency and still have an accurate conversion system. In addition to the foregoing, once the switching period is set, there must be some manner of determining when the period of the input signals have exceeded the duty cycle of the switching signal and resulted in an erroneous conversion signal.

It is therefore an object of this invention to provide a new and improved frequency-to-direct current conversion system.

It is also another object of this invention to provide a new and improved frequency-to-direct current conversion system that can be adjusted to increase the efficiency of operation over various ranges of input signals.

It is also an object of this invention to provide a new and improved monostable switching circuit that has a high duty cycle and a period that can be readily adjusted over a wide range of frequencies and still be highly stable in operation.

It is a still further object of this invention to provide a new and improved circuit for detecting when the frequency of the input signals to a frequency-to-direct current conversion system is exceeded.

It is a still further object of this invention to provide a circuit for converting constant amplitude and preset time duration pulses to a predetermined nonlinear function of the repetition rate of the pulses.

SUMMARY OF THE INVENTION

A conversion circuit including the invention includes a monostable switching circuit for providing a switching signal of constant amplitude and preset duration for each cycle of input signal received. The switching signal is averaged to provide a direct current output that is a function of the frequency of the input circuit. An overfrequency detection circuit is provided to determine when the period of the input signal is less than the time duration of the switching signal. The overfrequency detection circuit compares the duty cycle of the switching with the period between input pulses. When the period between the pulses is less than the duty cycle, an error signal is generated.

A further feature of the invention provides averaging circuit means that develops a direct current signal that is proportional to and/or a nonlinear function of the input frequency. The nonlinear function can, for example, be a logarithmic function.

A still further feature of the invention provides a highly stable adjustable monostable switching circuit for the conversion circuit so that the preset time duration of the monostable switching circuit can be adjusted more efficiently to convert the desired range of input frequencies.

PREFERRED EMBODIMENT

Figure 1:
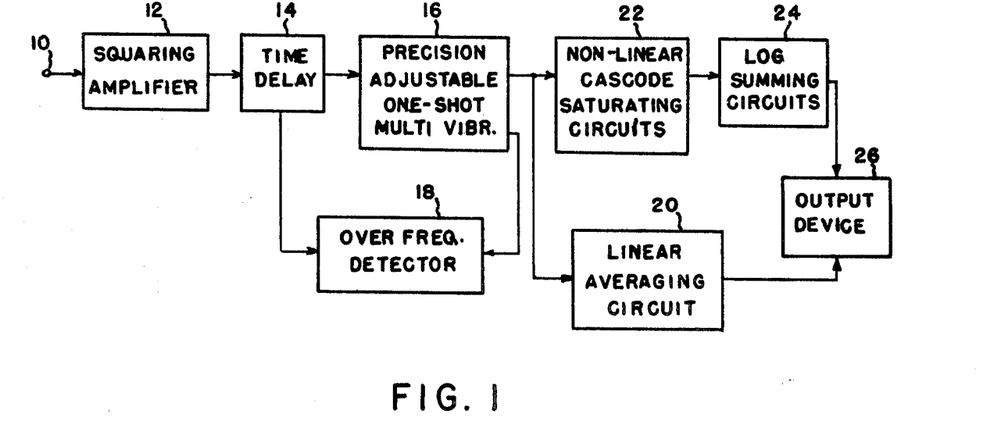
FIG. 1 is an overall block diagram of a frequency to direct current conversion system including the invention for providing a direct current signal that is proportional to and/or a predetermined nonlinear function of frequency.
Figure 2:
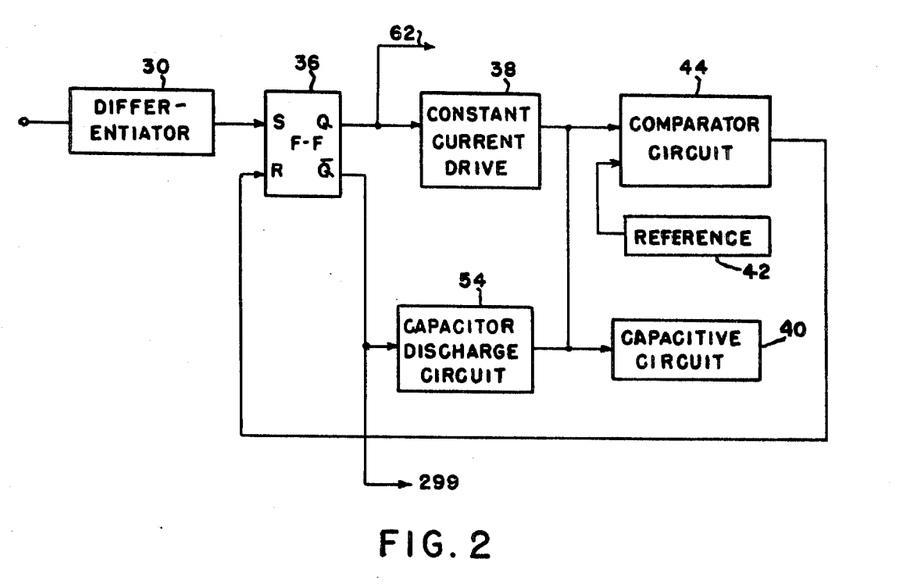
FIG. 2 is an expanded block diagram of the precision one-shot multivibrator of FIG. 1.
Figure 5:
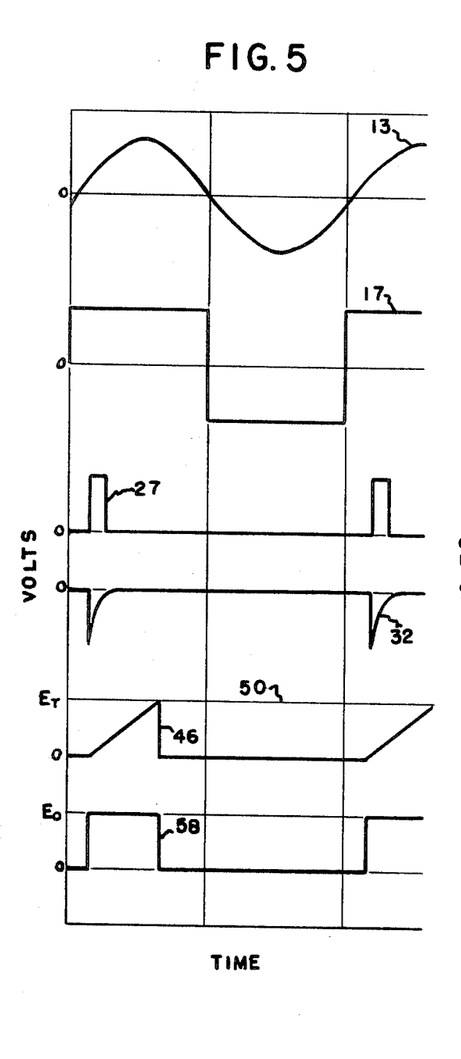
FIG. 5 is a graphic representation of the signals of the system of FIGS. 1, 2, and 3 and aid in the explanation of the system.
Figure 6:
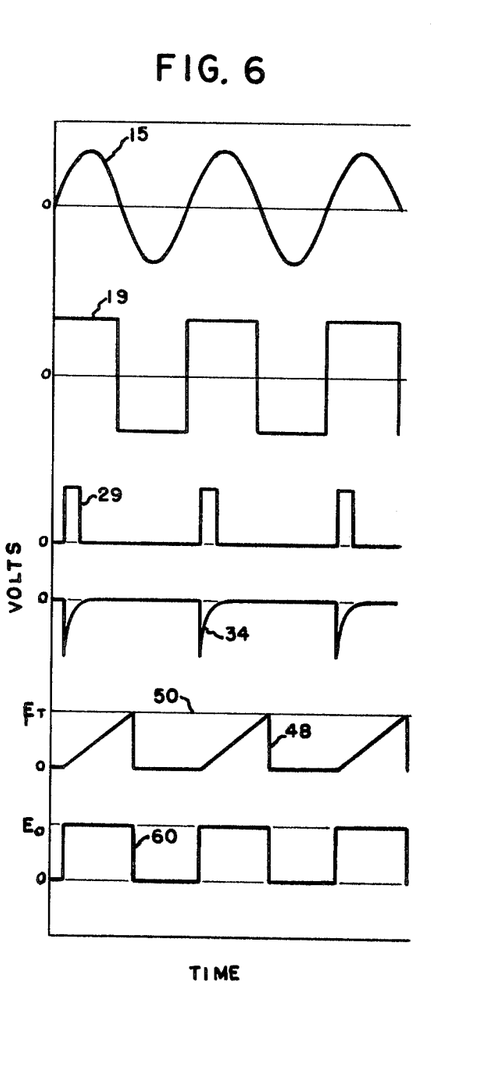
FIG. 6 is a graphic representation of the signals within the system of FIGS. 1, 2, and 3 at a frequency twice that of FIG. 5.

In FIG. 1, the periodic signals to be converted into a direct current signal are applied to the input terminal 10 of a squaring amplifier 12. The squaring amplifier 12 converts the input signals into constant amplitude signals. For example, if the input signals are the sinusoidal signals 13 and 15 (FIGS. 5 and 6), the input signals are converted into the square waves 17 and 19 (FIGS. 5 and 6), having the same frequency or period as the input signals. If the input signals are square waves, the squaring amplifier can be eliminated.

The square wave signals from the squaring amplifier 12 are applied through a time delay circuit 14 to an adjustable precision one-shot or monostable multivibrator circuit 16. The precision multivibrator circuit 16 provides a pulse of preset duration and constant amplitude for each cycle of a signal applied to the system. The precision one-shot multivibrator has an adjustable period that is adjusted to approach the period of the highest frequency of the signals to be converted. An overfrequency detector circuit 18 is coupled between the precision multivibrator 16 and the time delay circuit 14 to determine when the frequency of the input signals applied to the terminal 10 exceed the highest frequency to which the precision multivibrator 16 was set. By setting the duty cycle of the precision multivibrator 16 to approach 100 percent at the highest frequency expected to be tested or converted, the operation of the system is optimized over the expected range of input signals.

The output from the precision multivibrator circuit 16 is applied to a linear averaging circuit 20 that provides a direct current signal having a magnitude that is proportional to the frequency of the input signal, and also through a nonlinear cascode saturating circuit 22 to a summing circuit 24 that provides a direct current signal that has a magnitude that is a nonlinear or logarithmic function of the frequency of the input signal. The linear averaging circuit 20 and the summing circuit 24 are coupled to a direct current output device 26 that provides a reading proportional to the frequency and/or nonlinear (logarithmic) function of the frequency of the signal applied to the terminal 10. It should be noted at this time that the time delay circuit 14 is not necessary for the operation of the frequency conversion circuit, but is used in the overfrequency detection system.

The operation of the precision multivibrator 16 will be explained with reference to FIGS. 2, 3, 5, and 6. The delayed signals from the time delay circuit 14 (pulses 27 and 29, FIGS. 5 and 6) are differentiated by a differentiator circuit 30 (FIG. 2) to produce the sharp pulses 32 and 34 (FIGS. 5 and 6) which "set" the bistable flip-flop circuit 36. It should be noted that one negative differentiated pulse is generated for each cycle of signal of the input signal. When the R-S flip-flop 36 is "set," a constant current drive circuit 38 is rendered conductive to charge a storage or capacitive circuit 40. The potential stored in the capacitive circuit 40 is compared to a reference potential 42 by a comparator circuit 44 which is in turn connected to "reset" the flip-flop 36 when the capacitor circuit 40 charges (waveforms 46 and 48, FIGS. 5 and 6) to a preset level 50. The constant current drive circuit 38 charges the capacitive circuit at a substantially constant rate to produce the sawtooth waveforms 46 and 48. When the flip-flop 36 is "reset" the constant current drive circuit 38 is cut off and a discharge circuit 54 is enabled to rapidly discharge the capacitive circuit 40. The precision multivibrator circuit output circuit (line 62) provides the output pulses 58 and 60 (FIGS. 5 and 6) having a constant amplitude and a preset duration. One precision square wave pulse is produced for each cycle of input signal.

Figure 3:
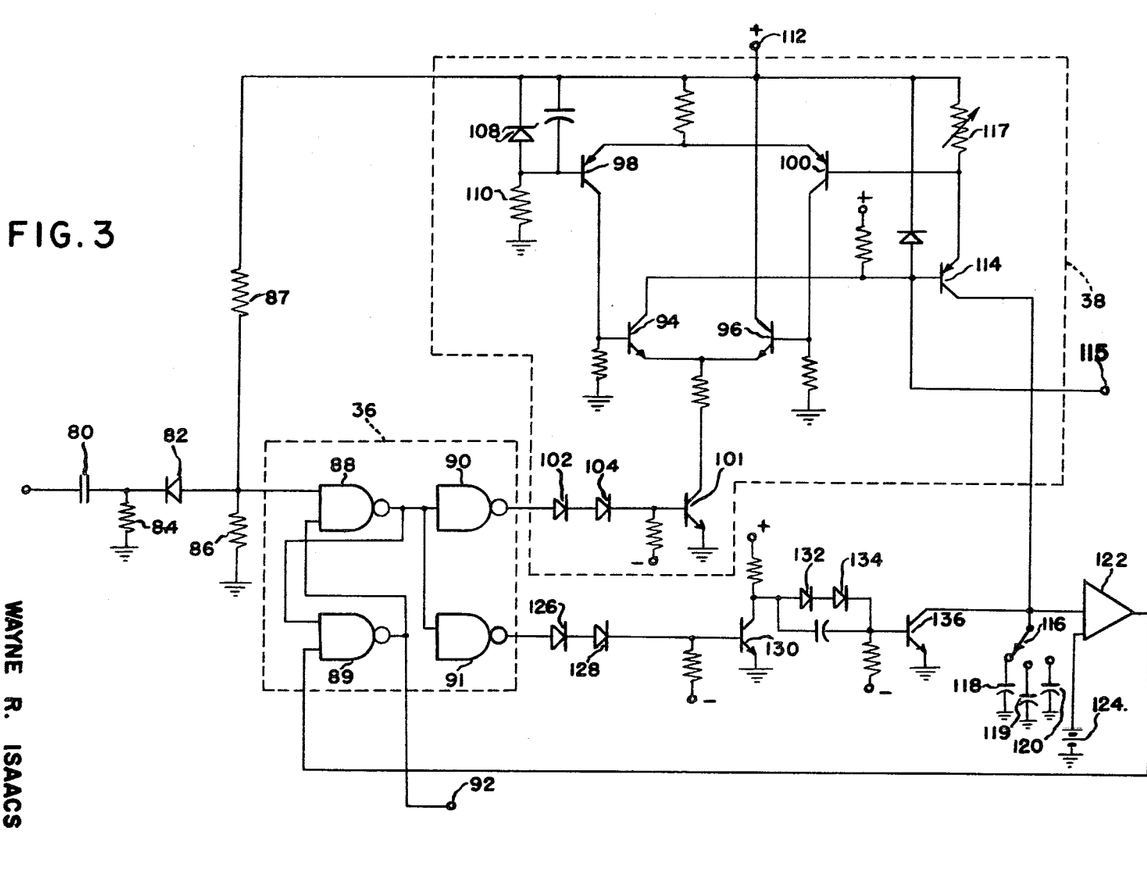
FIG. 3 is a schematic diagram of the precision one-shot multivibrator of FIGS. 1 and 2.

In the schematic diagram of FIG. 3 the differentiator circuit includes the capacitor 80, the diode 82 and the resistors 84, 86, and 87. The flip-flop 36 is formed of the NAND gates 88 and 89. The NAND gates 90 and 91 are output buffers. One of the input circuits of the NAND gate 88 is connected to receive the differentiated signals and its output circuit is connected to one of the input circuits of the other NAND gates 89, 90, and 91. The other input circuit of the NAND gate 88 is coupled to the output circuit of the NAND gate 89 and also to an output terminal 92.

The NAND gate 90 is connected to the constant current drive circuit 38. The constant current drive circuit includes the transistors 94 and 96, 98 and 100 connected as a pair of direct coupled differential amplifier circuits and a transistor 101 connected as an enable gate. The NAND gate 90 is coupled through a pair of diodes 102 and 104 to the transistor 101 connected in the common emitter circuit of the transistors 94 and 96. A Zener diode 108 is connected in series with a resistor 110 and power supply point 112 to provide a constant bias for the transistor 98. The transistor 94 is connected to drive a transistor 114 which in turn is connected to a select switch 116 for selecting one of the capacitors 118—120 and through a potentiometer 117 to the power supply point 112. The differential amplifier 122 provides a constant amplitude output signal that is regulated in amplitude against the Zener diode 108.

The constant current drive circuit provides an adjustable current source for charging any of the capacitors 118—120 selected by the switch 116 at a substantially constant rate. When the differentiated pulse is received by the NAND gate 88, the NAND gate 90 renders the transistor 101 conductive. This allows the transistors 94 and 96 to conduct and turn on the transistor 114 to charge the selected capacitor.

A high gain differential amplifier circuit 122 is connected to the switch 116 and a reference source 124 to compare the charge stored on the selected capacitor 118—120 to the reference potential. When the selected capacitor is charged to a preset level the differential amplifier 122 is switched to apply a signal to the NAND gate 89 to "reset" the flip-flop 36.

The NAND gate 91 is connected through the diodes 126 and 128 to a transistor 130 to render the transistor 130 nonconductive when the flip-flop circuit 36 is reset. The transistor 130 is connected through the diodes 132 and 134 to render the transistor 136 conductive to discharge the connected capacitors 118—120 to ground.

The circuit of FIG. 3 functions to provide a square wave output to the terminal 92 that has a substantially constant amplitude and a very stable adjustable time duration. The time duration or duty cycle of the circuit is determined by the setting of the potentiometer 117 and the switch 116. The combination of the switch 116 and the potentiometer 117 provides a highly stable means of variably preselecting the period of the precision multivibrator over a relatively wide range. Alternately, the potentiometer 117 may comprise a plurality of potentiometers and the select switch 116 may include a second ganged section that connects various ones of the plurality of potentiometers in the emitter circuit of transistor 114 in accordance with the desired period. This allows the potentiometers to be used to calibrate the available period of the multivibrator.

Figure 4A:
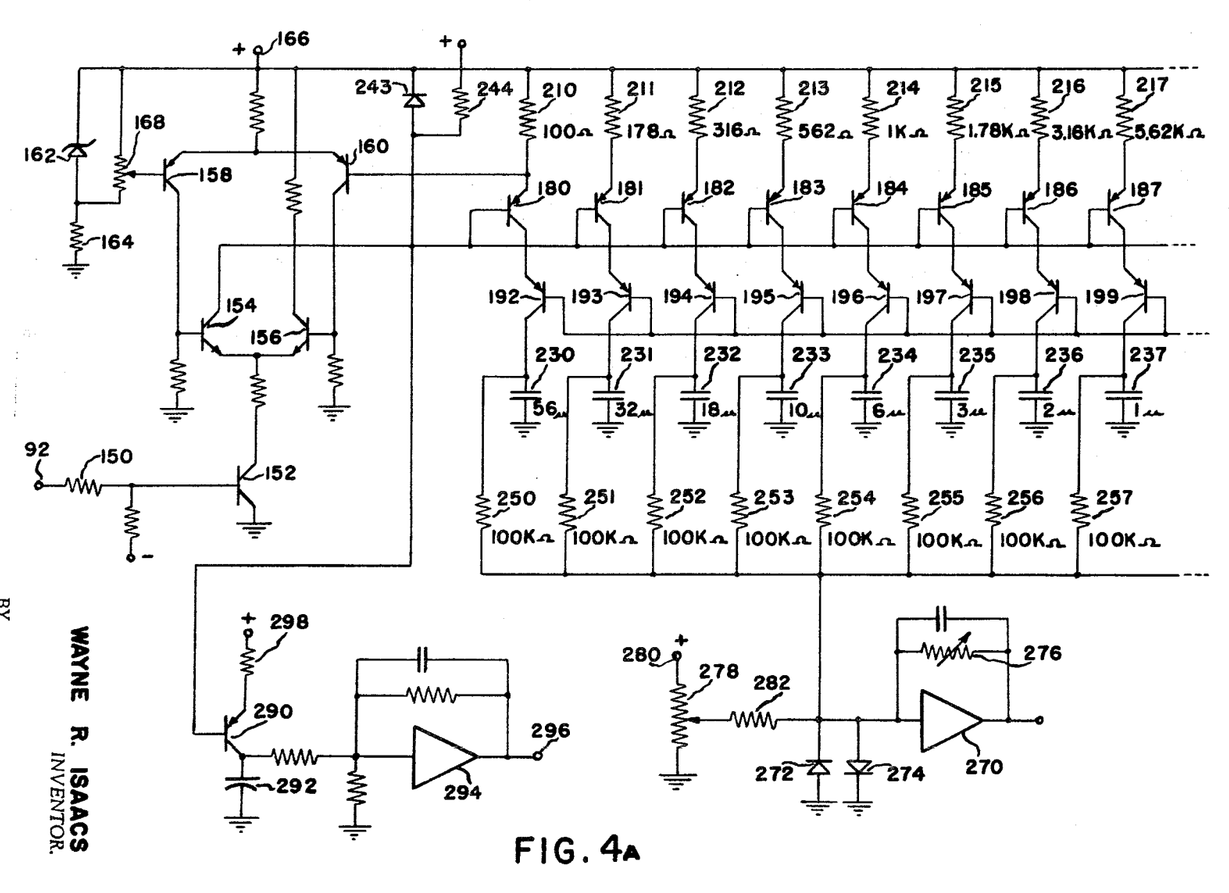
FIGS. 4A and 4B are schematic diagrams of the nonlinear converter circuit and the linear averaging circuit of FIG. 1 and drive circuit therefor.

In FIG. 4A, the square wave pulse generated by the precision multivibrator circuit is applied from the terminal 92 through a resistor 150 to the base of a control transistor 152. The transistor 152 is connected in the emitter circuit of a differential amplifier circuit including the transistors 154 and 156. The transistors 154 and 156 drive a second direct current differential amplifier circuit including the transistors 158 and 160. The transistors 152—160 provide a regulated drive circuit. A Zener diode 162 is connected in series with the resistor 164 between a power supply terminal 166 and ground and through a potentiometer 168 to provide adjustable bias for the transistor 158. The collector of the transistor 154 is connected to the logarithmic and linear conversion circuits 22 and 20.

The logarithmic converter circuit (FIGS. 4A and 4B) includes 12 pairs of saturable switching circuits including the cascode connected transistors 180—203. The cascode pairs of transistors are connected in series with the resistors 210—221 to charge the capacitors 230—241. The base electrodes of the transistors 180—191 are directly connected to the collector electrode of the drive circuit transistor 154. The diode 243 and the resistor 244 provide a bias for the transistors 180—191 to assure that the cascode circuits are cut off in absence of a drive signal from the transistor 154. The base electrodes of the transistors 192—203 are connected to a power supply terminal 242 that provides a constant biasing potential designated as a clipping voltage. The voltage developed across the resistor 210 is applied to the base electrode of the drive circuit transistor 160 to provide a temperature compensating feedback to maintain the system temperature stable.

Figure 4B:
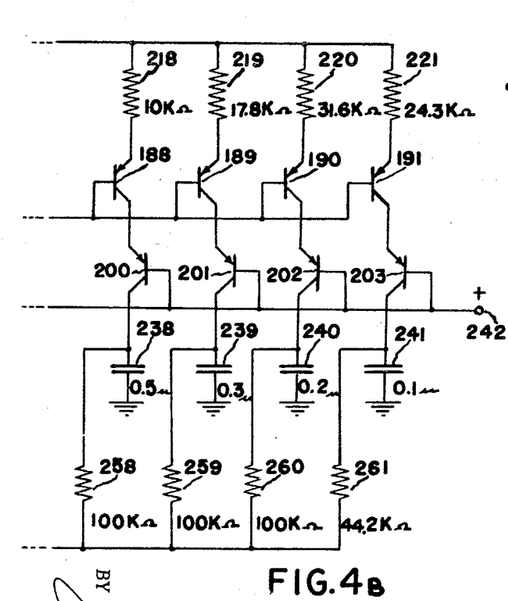

The voltage developed across the capacitors 230—241 is coupled through the load resistors 250—261 to the input of a direct current summing amplifier 270. A pair of back-to-back diodes 272 and 274 are connected between the amplifier input circuit and ground to provide a protection against over driving the amplifier 270. The gain of the amplifier is controlled by the feedback potentiometer 276. A biasing or calibration potential is provided for the amplifier 270 by a potentiometer 278 connected between a power supply terminal 280 and ground and through a series current limiting resistor 282.

The value of the components in the logarithmic circuit of FIG. 4 are designed primarily for a log base 10 conversion, but the circuit can be modified to provide other types of nonlinear conversion functions. In general, the conversion circuit of FIG. 4 can generate any nonlinear output function versus input signal frequency with the limitation that the slope of the output voltage versus the frequency must be at a maximum at the lowest frequency, and decreases with increasing frequency, and also must remain positive. Furthermore, although 12 cascode circuits or segments are illustrated, it is to be understood that any number of cascode circuits can be used depending upon the accuracy desired.

The logarithmic conversion circuit of FIG. 4 adds the voltage developed across the capacitors 230—241. The signal developed across each capacitor has a different output voltage versus input frequency characteristics or slope and also a different saturation point versus input frequency. Normally, with no input signal the drive circuit maintains all transistors 180—241 cut off. When the precision one-shot multivibrator is set, the drive circuit (transistors 152—160) supplies the base drive for the transistors 180—191. It is preferable that the transistors 180—191 exhibit a relatively flat base emitter voltage versus collector current characteristics so that it is only necessary to put one of the base emitter-to-base junctions inside the feedback loop (as illustrated) to adequately compensate all the transistors for temperature changes.

The operation of the logarithmic conversion circuit will be explained by looking at one segment or cascode circuit including the transistors 181 and 193, resistors 211 and 251, and the capacitor 231. The waveform applied to the base of the transistor 181 is a square wave whose duration is determined by the precision one-shot multivibrator 16 and whose amplitude is determined by the amplitude of signal developed by the transistor 154 and has a repetition rate determined by the input frequency. The common emitter transistor 181 provides an output current inversely proportional to the value of the resistor 211. This current drives the common base transistor 193. The current through the transistors 181 and 193 is averaged by the storage circuit including the capacitor 231 and resistor 251 to provide an average output current through the resistor 251 to the summing circuit amplifier 220 that is a function of frequency.

If the switching current of the segment is high (as determined by the value of resistor 211) the slope of the curve of average current versus frequency will be high, and vice versa. The capacitor 231 will charge according to the slope of the curve until the voltage across the capacitor (as determined by the average current through resistor 251 and the load resistor 211) reaches the clipping voltage supplied at the terminal 242. When the clipping voltage is reached, no further increase in the voltage across the capacitor results from further increasing the repetition rate. It should be noted that the clipping or saturation of one segment does not effect the operation of the other segments. In effect, each of the segments is isolated from the others allowing each segment to be independently saturated. As a result, only a single driving stage is necessary to drive a large number of the cascode circuits.

In determining or approximating the accuracy to which the logarithmic converter circuit is to function, the maximum error for any segment will result between break points which are spaced one from the other, by constant decibel (db.) increments. A one db. increment gives a −0.0148 db. maximum single-sided error, a three db. increment gives a −0.0575 db. error, so that the increment may be calculated from a selected design error. After the increment is selected, the frequency break points of the segments are determined. The overall slope of all the segments may be found as:

$$\text{Slope}_n = \frac{\log [\text{Freq } (N)] - \log [\text{Freq } (N-1)]}{\text{Freq } (N) - \text{Freq } (N-1)} \quad \text{(Equation 1)}$$

where $n$ = the number of segments.

Since all the segments are summed, the last segment ($N$) has the correct slope. The slope of the second last segment $N-1$ is Slope ($N-1$) − Slope ($N$). These slopes are in log value per cycle of input signal. These slopes may then be normalized by dividing all calculated slopes by Slope 1 so that Slope $N1$ has the value of one, Slope $N2$ as the next smaller value, etc., and Slope $NN$ has the least slope of all.

Since it is desired that the number of segments will be in even digits, a db. range is picked as the next higher number over the desired db. range that is an even multiple of the segment increment. Thus, having 60 db. range and a 1.3 db. increment, the actual range would be 61.1 db. and the circuit would have 47 segments. In order to simplify the calculations, it can be assumed that the starting frequency is one cycle, with a db. value of zero and a log value of one. The maximum frequency in this case would be $\log_{10}{}^{11}$ (61.1/20). The period of precision one-shot is calculated as some multiplier less than one times the period of the maximum frequency. A reasonable value of 0.9 results in a maximum duty cycle of 90 percent for one-shot, which is readily attainable with the system as illustrated.

Since the slope at the lowest frequency is the greatest, it logically follows that the segment generating the lowest breakpoint must switch the maximum current. Therefore, a switching voltage and first emitter resistor 210 are selected which results in a value of switched current maximum in the first segment. A value for the load resistor 250 is then picked for the segment, from which the clipping voltage can be calculated. The slope of the segment is determined by the following equations:

$I_{sw} = E_{swv}/R_e$ (Equation 2)
$E_c = _{sw} R_L P_{os} F_{SAT}$ (Equation 3)
where:
$I_{SW}$ = emitter switched current
$E_C$ = clipping voltage
$E_{SWV}$ = Switching voltage
$R_L$ = load resistor $P_{OS}$ = one-shot period
$F_{SAT}$ = frequency at break-point
The slope of a segment is computed:

$$\text{Slope} = \frac{E_C/B_L C}{F_{SAT}} \quad \text{(Equation 4)}$$

If the value for the slope of the first segment is then multiplied times all the normalized segments as previously calculated, a table in amperes per cycle can be used to calculate the value of the emitter resistors and load resistors of all the succeeding stages. In the calculations, the capacitor value of each stage is assumed to be large enough to convert the switched current to average current output without significant error. Thus, the exact value of the capacitor is not significant as long as it is large enough. In addition, if the table of slopes in amperes per cycle is added together (since the initial frequency was shown as one cycle) the sum will be the offset current generated by the network at the initial frequency. Since all the segments are saturated at maximum frequency the output current at maximum frequency is calculated as follows:

$$I = \sum_{N=1}^{N} \frac{E_c(N)}{R_L} \quad \text{(Equation 5)}$$

In the case of the 12 segment circuit of FIG. 4, an increment of 5 db. was selected. The maximum frequency is 1000 cycles or 60 db. range. The switching current for the first segment was selected as 0.05 Amps.

In the case of the linear conversion system the collector of the transistor 154 is connected to a transistor 290, which is coupled to charge an averaging capacitor 292. The pulses from the drive circuits are averaged by the capacitor 292 to provide a voltage that is proportional to the frequency of the input signal. The voltage developed across the capacitor 292 is amplified by direct current amplifier 294 and appears at an output terminal 296.

A significant advantage of this particular log circuit is the ease with which it can be scaled. Since the conversion circuit is time and not frequency dependent, the 1 to a 1000 scale can be easily changed to cover any 60 db. range with a maximum frequency for the circuits shown of 600 kc., or a range of 600 ~ to 600 kc. by simply changing the one-shot period.

If it is desired to have only an output signal that is linearly proportional to the frequency of the input signal, the logarithmic portion of the system and the drive circuit of FIG. 4 can be deleted. The transistor 290 of the linear averaging circuit can be driven directly from the precision multivibrator 16 terminal 115, (FIG. 3) instead.

Figure 7:
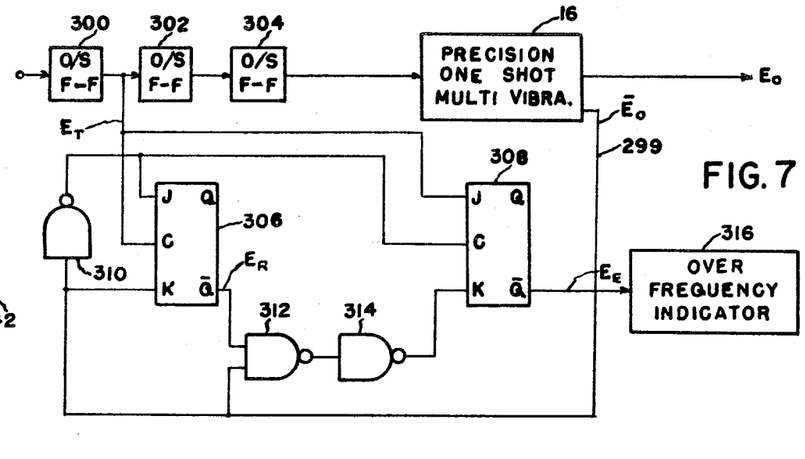
FIG. 7 is a block diagram of an overfrequency detection circuit of FIG. 1.

The overfrequency detector circuit of FIG. 7 determines when the input signal to the squaring amplifier 12 has a period shorter than the duty cycle of the precision one-shot multivibrator circuit 16. The input signal from the squaring amplifier 12 is applied through three monostable or one-shot circuits 300, 302, and 304 to the precision multivibrator circuit 16. The one-shot flip-flops 300—304 serve to provide three consecutive delays in the order of one-half microsecond each. The operation of the precision multivibrator 16 is delayed by all three flip-flops. As previously mentioned, these delays are not necessary for the operation of the frequency converter portion of the system but are used in the overfrequency detector circuit.

The output $E_{T_1}$ or $E_{T_2}$ from the flip-flop 300 (illustrated as the waveforms 301 and 303 of FIG. 8) is applied to a C input of a bistable flip-flop circuit 306 and to the J input terminal of a bistable flip-flop 308. The output $\overline{E_o}$ from the precision multivibrator circuit 16 (illustrated as waveform 309, FIG. 8) is directly coupled on line 299 to the K input circuit of flip-flop 306 and to an inverter circuit 310. The output $\overline{E_o}$ (waveform 311, FIG. 8) from the inverter circuit 310 is applied to the J input circuit of the flip-flop 306 and the C input of the flip-flop 308. The input circuits of a NAND gate 312 are connected to receive the output signal $\overline{E_o}$ from the precision one-shot multivibrator 16 and the output signal $E_R$ (waveform 313, FIG. 8)

from the $\bar{Q}$ output circuit of the flip-flop 306. The output from the NAND gate 312 is coupled through an inverter circuit 314 to the K input circuit of the flip-flop 308. The $\bar{Q}$ circuit of the flip-flop 308 is connected to apply an error signal $E_E$ (waveform 315, FIG. 8) to an overfrequency indicator 316 which can, for example, be a light or a buzzer to indicate that the period of input signal is less than the period of the precision one-shot multivibrator circuit. At this time any reading on the output device 26 (FIG. 1) is in error.

The flip-flops 306 and 308 are the type that require simultaneous pulses to the C and J input terminals to be "set" and simultaneous pulses to the C and K terminals to be "reset." For purposes of illustration it is assumed that positive pulses are required to "set" and "reset" the flip-flops, and when the flip-flops are "reset" a positive voltage is developed at the $\bar{Q}$ terminal. It is to be understood, however, that other conventions can be selected and the circuit modified accordingly.

Figure 8:
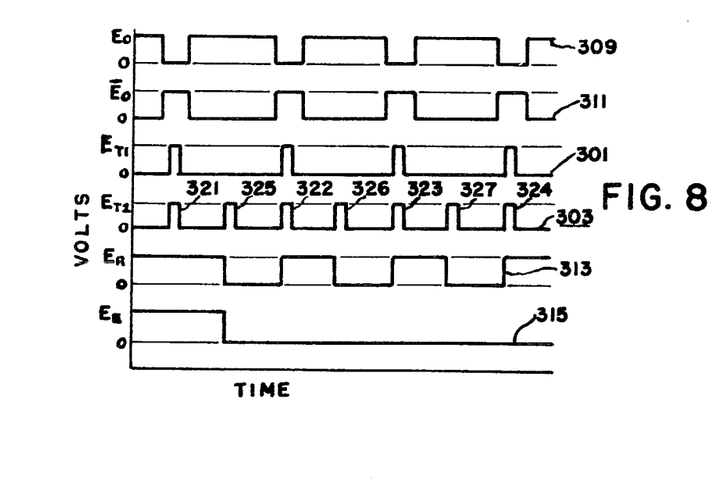
FIG. 8 is a graphic representation of the operation of the overfrequency detector circuit of FIG. 7.

The waveform 301 ($E_{T1}$) generated by the one-shot 300 corresponds to a normal input signal having a period greater than that of the period of the precision multivibrator. In the normal condition, these pulses only occur during the time waveform 309 ($E_o$) is at the zero level. The waveform 303 ($E_{T2}$) illustrates an example of an error condition wherein the input signal frequency has a period less than that period of the precision multivibrator 16. The waveform 303 includes normal pulses 321—324 (those occuring during the time waveform $E_o$ is zero) and abnormal pulses 325—327 (those occuring during the time waveform $E_o$ is positive).

In the normal operating condition (waveform 301) the flip-flops 306 and 308 are "reset" and remain in the "reset" condition. When the input frequency is too high, abnormal pulses (pulses 325—327) are generated by the one-shot 300 during the time the precision multivibrator is "set" (waveform 309 is positive). At this time the potentials at the J and C terminals of the flip-flops 306 and 308 are positive and both flip-flops are "set." When the flip-flop 308 is "set" the overfrequency indicator 316 is actuated to provide an overfrequency indication.

The flip-flop 306 is "reset during the next normal pulse and "set" again during the next abnormal pulse. Accordingly in the overfrequency condition the flip-flop 306 is "set" and "reset" by alternate abnormal and normal pulses and continues so until the overfrequency condition is eliminated.

The flip-flop 308 remains continually "set" while the overfrequency condition is present. This is because the NAND gate 312 cannot be enabled while the flip-flop 306 is in the "set" condition (signal at $\bar{Q}$ of flip-flop 306 is zero). This condition continues until the input frequency is reduced so that no further abnormal pulses from the one-shot 300 occur during the time waveform 309 ($E_o$) is positive. The flip-flop 306 is left in the "reset" condition by the last normal pulse, wherein the NAND gate is enabled by a positive $\bar{Q}$ output from flip-flop 306 and the next $\bar{E}_o$ signal (waveform 311) to "reset" the flip-flop 308. This deactivates the overfrequency indicator 316 providing an indication of normal operation.

Hence, both the flip-flops 306 and 308 remain in the "reset" condition when the period of the input signal is less than that of the precision multivibrator 16. When the period of the input signal is less than that of the precision multivibrator abnormal pulses are generated by the one-shot 300 during the time the precision multivibrator is "set" and normal pulses are generated during the time the precision multivibrator is "reset." Both flip-flops 306 and 308 are "set" by the first abnormal pulse. The flip-flop 308 remains in the "set" condition while the flip-flop 306 is alternately "reset" and "set" by subsequent normal and abnormal pulses respectively. This condition continues until the period of the input signal is greater than that of the precision multivibrator, at which time no further abnormal pulses are generated. The flip-flop 306 is now left in the "reset" condition by the last normal pulse allowing the flip-flop 308 to be "reset" by the next positive $\bar{E}_o$ pulse.

I claim:

1. Apparatus for converting periodic signals into a direct current signal comprising:

input circuit means for receiving said periodic signals;

a monostable switching circuit coupled to said input circuit for switching thereof by said periodic signals and having a duty cycle to produce switching signals of constant amplitude and preset time duration;

first circuit means for adjusting the duty cycle of said switching circuit to approach the period of the highest frequency signal to be converted thereby defining the range of periodic signals to be converted;

second circuit means coupled to said input circuit means and said switching circuit for determining when said range of periodic signals is exceeded, and third circuit means coupled to said monostable switching circuit for connecting said switching signals to a direct current signal having a magnitude that is a function of the frequency of the periodic signal applied to the input circuit means.

2. Apparatus as defined in claim 1 wherein said first circuit means adjusts the duty cycle of said switching circuit to approach 90 percent of the period of the highest frequency to be measured.

3. Apparatus as defined in claim 1 wherein said third circuit means produces a direct current signal having a magnitude proportional to the frequency of the periodic signal.

4. Apparatus as defined in claim 1 wherein said third circuit means produces a direct current signal having a magnitude that is a logarithmic function of the frequency of the periodic signal.

5. Apparatus for converting periodic signals into a direct current signal comprising:

input circuit means for receiving said periodic signals;

a monostable switching circuit for switching thereof by pulse type signals and having a duty cycle to produce switching signals having constant amplitude and a preset time duration at the repetition rate at which said pulse type signals are received;

circuit means coupled between said input circuit means and said monostable switching circuit for converting said periodic signals into pulse type signals having a time duration substantially shorter than said duty cycle and having a repetition rate equal to that of said periodic signals;

circuit means coupled to said monostable switching circuit for converting said switching signals into a direct current signal having a magnitude that is the function of the frequency of said periodic signals, and circuit means coupled between said input circuit means and said switching circuit for determining when the period of said periodic signals is less than the said duty cycle.

6. A circuit for converting periodic signals having constant amplitude and time duration and varying in frequency into a direct current signal that is a logarithmic of the frequency comprising:

a plurality of amplifying devices, each includes first and second electrodes defining a controllable current flow therebetween;

a plurality of capacitive circuit means;

first circuit means for connection to a source of unidirectional energizing potential;

second circuit means for connecting the first and second electrodes of pairs of amplifying devices in a series circuit between said first circuit means and separate ones of said capacitive means;

separate impedance means connected in said series circuits for controlling the rate said capacitive circuit means are charged by said series circuits, the value of said impedance means varies between various series circuits so that said various capacitive circuit means charge at different rates;

third circuit means for applying a constant biasing potential to one of the control electrodes of each of said pair of series amplifying devices;

fourth circuit means for applying said periodic signals to the other control electrode of each of said pairs of series amplifying devices for rendering said series circuits conductive to charge the connected capacitive circuit means, and summing circuit means coupled to said plurality of capacitive circuit means to provide a direct current signal that is a logarithmic function of the frequency of said periodic signal.

7. A circuit as defined in claim 6 wherein:
said impedance elements comprise resistive elements;
said resistive elements are connected between said amplifying devices receiving said periodic signals and said first circuit means, and
said amplifying devices receiving said constant biasing potential are connected between said amplifying device receiving said periodic signal and said capacitive circuit means.

8. A circuit as defined in claim 6 wherein:
said amplifying devices are transistors;
said transistors receiving said periodic signal have their emitter electrodes connected to said first circuit means through said resistive element, and
said transistors receiving said constant biasing potential have their emitter electrodes connected to the collector of the other series transistors and the collector of the other series transistors and the collector electrode connected to separate ones of said capacitive circuit means.

9. A circuit for converting periodic signals having a constant amplitude, preset time duration and a variable repetition rate into a direct current signal that is a nonlinear function of the repetition rate comprising:
a plurality of cascode connected amplifying circuits each circuit being connected to charge a different capacitive circuit and each circuit including a series impedance element for controlling the rate at which the cascode amplifying circuit charges the connected capacitive circuit, the value of said impedance elements of the plurality of cascode circuits are selected to charge the connected capacitive circuits at different rates to thereby define the nonlinear function;
circuit means for applying said periodic signals to said plurality of cascode circuits to render the cascode circuits conductive at the repetition rate of said periodic signals, and
summing circuit means coupled to said plurality of capacitive circuits to provide a direct current signal that is the sum of the potentials stored in said capacitive circuits.

10. The circuit as defined in claim 9 wherein:
said impedance elements are resistive elements, and
the resistive elements and the connected capacitive circuits have values so that cascode circuits saturate at different repetition rates of the periodic signals.

11. The circuit as defined in claim 10 wherein:
the values of the resistive elements and in the capacitive circuits are selected so that the sum of the potentials stored by the capacitive circuits approaches a logarithmic function of the repetition rate of said periodic signal.

12. A circuit for receiving periodic pulses having a constant amplitude and fixed time duration and converting the pulses to a direct current signal that is a predetermined nonlinear function of the repetition rate of said pulses comprising:
a plurality of cascode saturable circuits, each of said circuits includes two series amplifying devices connected to charge a capacitive circuit from a power source through a series resistive element, the resistive element and capacitive circuit are selected to saturate the cascode circuits at different repetition rates of the periodic pulses thereby defining the nonlinear function;
circuit means for applying said periodic pulses to one of said amplifying devices of each of said cascode circuits for rendering said cascode circuit conductive at the repetition rate of said pulses, and circuit means for summing the potentials developed in said capacitive circuits to provide a direct current signal that is said nonlinear function of the repetition rate of said periodic pulses.

13. A circuit for converting periodic pulses having a constant amplitude and duration into a direct current signal that is a predetermined nonlinear function of the repetition rate of said pulse comprising:
first circuit means for connection to a source of unidirectional energization potential;
a plurality of saturable switching circuits connected to said first circuit means, each of said switching circuits including a capacitive circuit, a resistor and saturable switching means connected for conduction from said source through said resistor to charge said capacitive circuits, the value of said resistors and said capacitive circuits being selected for saturation of said switching circuits at different repetition rates defining the nonlinear function;
second circuit means coupled to the saturable switching means in each of said switching circuits for applying said periodic pulses to render said switching means conductive, and
summing circuit means coupled to said capacitive circuits for summing the charge in said capacitive circuits and provide a direct current signal that is the nonlinear function of the repetition rate of said periodic pulses.

14. An adjustable precision multivibrator circuit comprising:
a flip-flop circuit having two stable states of operation;
circuit means for applying input signals to switch said flip-flop circuit into said first state;
a high gain differential amplifier circuit;
capacitive means;
switching circuit means including an adjustable series resistor connected to charge said capacitive means from a unidirectional potential source;
first circuit means connecting said high gain differential amplifier circuit to said switching circuit means for rendering said switching circuit means conductive;
second circuit means coupling said flip-flop to said high gain differential amplifier circuit so that said high gain differential amplifier circuit renders said switching means conductive when said flip-flop circuit is in said first state of operation;
third circuit means coupled between said capacitive means and said flip-flop for switching said flip-flop into said second state of operation when said capacitive means becomes charged to a predetermined voltage level, and
fourth circuit means coupled between said flip-flop and said capacitive for discharging said capacitive means when said flip-flop is in said second state of operation.

15. An adjustable precision multivibrator circuit as defined by claim 14 wherein:
said capacitive means comprises a plurality of capacitor and a switch connected in series with said capacitors for selecting at least one of said capacitors, and
said fourth circuit means comprising a switching circuit that is actuated to affectively short the seluted capacitor when said flip-flop is in said second state.

16. An adjustable precision monostable multivibrator circuit as defined in claim 14 wherein:
said third circuit means comprises a high gain differential circuit for comparing the charge on said capacitive means with a reference potential.

17. A circuit for determining when a repetitive input signal has a period shorter than the period of the unstable mode of operation of a monostable switching circuit comprising:
input circuit means for receiving said input signals;
first circuit means for converting said input signals into pulse type signals having a duration substantially shorter than said period of said unstable mode and having a repetition rate corresponding to the frequency of said input signals;

time delay circuit means coupled between said first circuit means and said monostable switching circuit for switching said monostable switching circuit into the unstable mode by said signal pulses, and second circuit means coupled between said input circuit means and said monostable switching circuit for providing an indication when the period between signal pulses is less than the period of said unstable mode of said switching circuit.

18. A circuit as defined in claim 17 where said second circuit means includes:

first and second bistable switching circuits having first and second stable states of operation;

third circuit means connecting said first switching circuit to said input circuit and said monostable switching circuit so that said first switching circuit is switched to said first state when the period between the pulses is greater than said period of said unstable mode and alternately switched between said first and second states when the period of the signal pulses is less than said period, and fourth circuit means connecting said second switching circuit to said input circuit, said monostable switching circuit and said first switching circuit for switching said second switching circuit to said first state when the period between signal pulses is greater than said period of said unstable mode and to said second state when the period between signal pulses is less than said period and said period and said first switching circuit is in said second state.

19. A circuit as defined in claim 18 including:

indication means coupled to said second switching circuit for providing an overfrequency indication when said second switching means is in said second state.

20. A circuit for determining when the repetition rate of a short duration input pulse type signal has a period between pulses that is shorter than the period of an unstable state of a monostable switching circuit, wherein the period of said unstable stub is substantially greater than the duration of said input pulses comprising:

a time delay circuit coupled to receive said input pulses and apply delayed input pulses to said monostable switching circuit for switching said monostable switching circuit into said unstable state at the repetition rate of said input pulses to produce long duration pulses substantially larger than said input pulses, the time delay being substantially shorter than said period of said unstable stubs;

first and second bistable switching circuits, each having first and second stable states of operation;

first circuit means coupled to apply said input pulses and said long pulses to said first and second switching circuits for switching said first and second switching circuits into said first state when the period between two input pulses is greater than said period of said unstable state;

second circuit means coupled to said first switching circuit to apply said input pulses and said long pulses to said first switching circuit to switch said first switching circuit to said second state when the period between two input pulses is less than said period of said unstable state, and third circuit means coupling said second switching circuit to said first switching circuit and said monostable switching circuit for switching said second switching circuit when said first switching circuit is in said second state and the period between two consecutive pulses is less than said period of said unstable state.

21. In a conversion circuit wherein a monostable switching circuit is switched into an unstable state of operation by pulse type input signals and switches back to a stable state after a preset period to produce output signals having a preset time duration at the repetition rate of the input signals, the improvements comprising:

a time delay circuit coupled to receive said input signals and apply delayed signals to switch said switching circuit into said unstable state after a predetermined time delay that is substantially shorter than said preset period, and circuit means receiving said input signals and said output signals to provide an error signal when the period between the input signals is shorter than the preset time duration of said output signal indicating that the output signal is not at the same repetition rate as the input signal.

22. The improvement as defined in claim 21 wherein said circuit means comprises:

first and second bistable switching circuits having first and second stable states of operation;

first circuit means connecting said first switching circuit to receive said input signals and said output signals so that said first switching circuit is switched to said first stable state when the period between input signals is greater than said output signal preset time duration and between said first and second states at the repetition rate of said input signals when the period between input signals is less that said preset time duration, and second circuit means connecting said second switching circuit to receive said input signals and said output signals and to said first switching circuit so that said second switching is switched to said first stable state when the period between input signals is greater than said output signal preset time duration and to said second state when said first switching circuit is in said second state and the period between input signals is less than said preset time duration.

UNITED STATES PATENT OFFICE
CERTIFICATE OF CORRECTION

Patent No. 3,581,217  Dated May 25, 1971

Inventor(s) WAYNE R. ISAACS

It is certified that error appears in the above-identified patent and that said Letters Patent are hereby corrected as shown below:

Column 5, line 54, change "$\log_{10}{}^{11}$" to -- $\log_{10}{}^{-1}$ --;

line 70, change "$E_c = {}_{sw}$" to -- $E_c = I_{sw}$ --;

Column 6, line 5, (Equation 4), change "$B_L C$" to -- $R_L C$ --;

Column 8, line 55, change "logarithmic" to -- logarithm --

Signed and sealed this 14th day of December 1971.

(SEAL)
Attest:

EDWARD M. FLETCHER, JR.          ROBERT GOTTSCHALK
Attesting Officer                Acting Commissioner of Patents